June 17, 1958   P. M. FRANCIS   2,839,009
PUSHER ASSEMBLY
Filed April 25, 1956   5 Sheets-Sheet 2

June 17, 1958   P. M. FRANCIS   2,839,009
PUSHER ASSEMBLY
Filed April 25, 1956   5 Sheets-Sheet 3

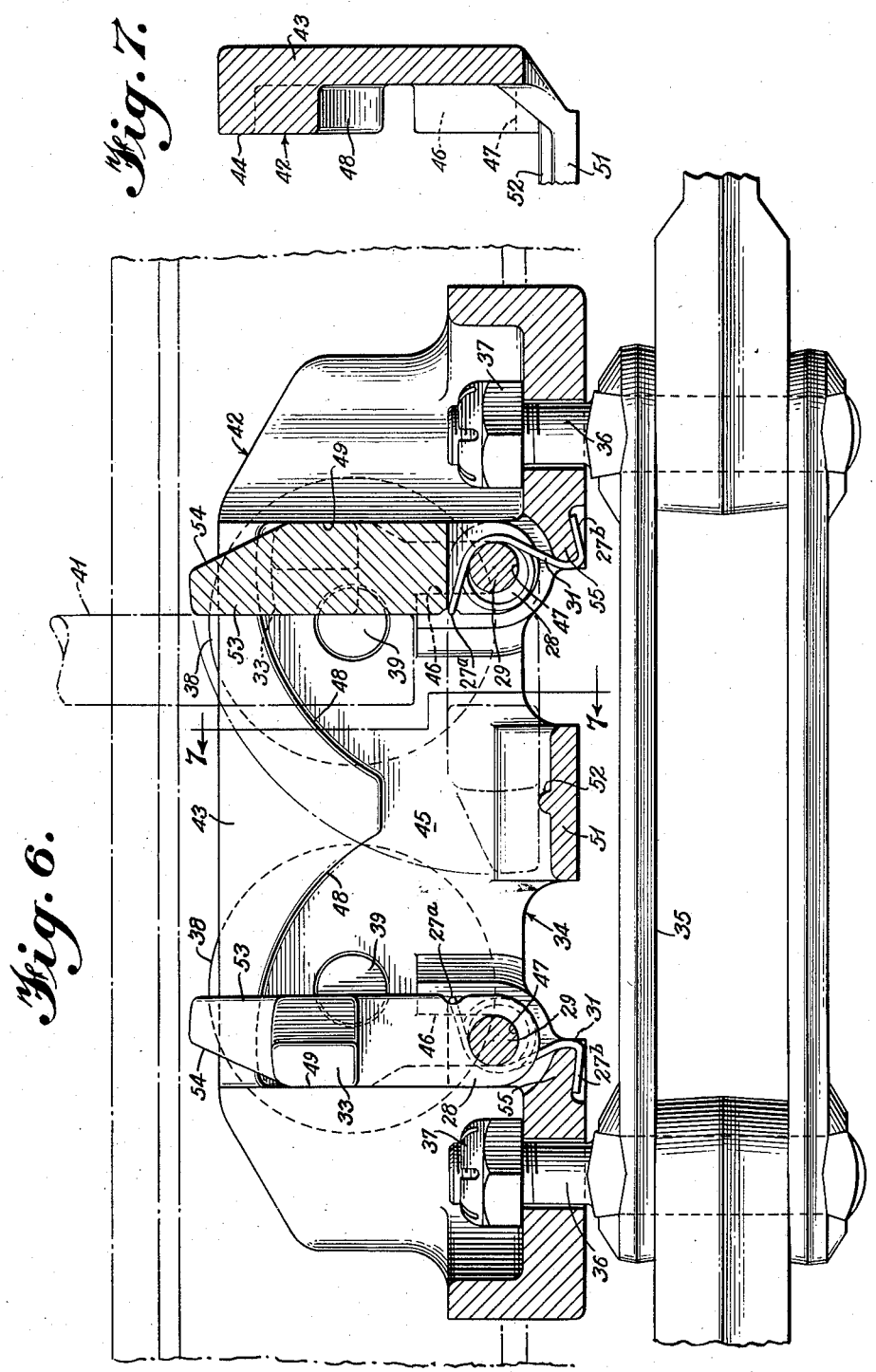

United States Patent Office 2,839,009
Patented June 17, 1958

2,839,009

PUSHER ASSEMBLY

Paul M. Francis, Danville, Ill., assignor to Link-Belt Company, a corporation of Illinois Application April 25, 1956, Serial No. 580,667

10 Claims. (Cl. 104—172)

This invention relates to new and useful improvements in pusher assemblies for drive line conveyor systems and deals more particularly with the construction and assembling of the bodies and the pivoted dogs of such pushers.

This application is a continuation-in-part of my co-pending application, Serial No. 448,114, filed August 5, 1954, for Pusher Assembly, and now abandoned.

It is the primary object of this invention to provide a pusher assembly having spring-biased dogs pivotally mounted in its body member in such a manner as to eliminate machining operations on the dog mounting portions of the body member.

A further important object of the invention is to provide a pusher assembly having spring-biased dogs pivotally mounted in its body member in such a manner that the dogs can be quickly and easily assembled with and disassembled from the body member.

A still further object of the invention is to provide a pusher assembly having a dog which is so mounted that a single element restrains the dog for pivotal movement and biases the dog into a normal operating position.

Other objects and advantages of the invention will be apparent during the course of the following description.

Figure 1:
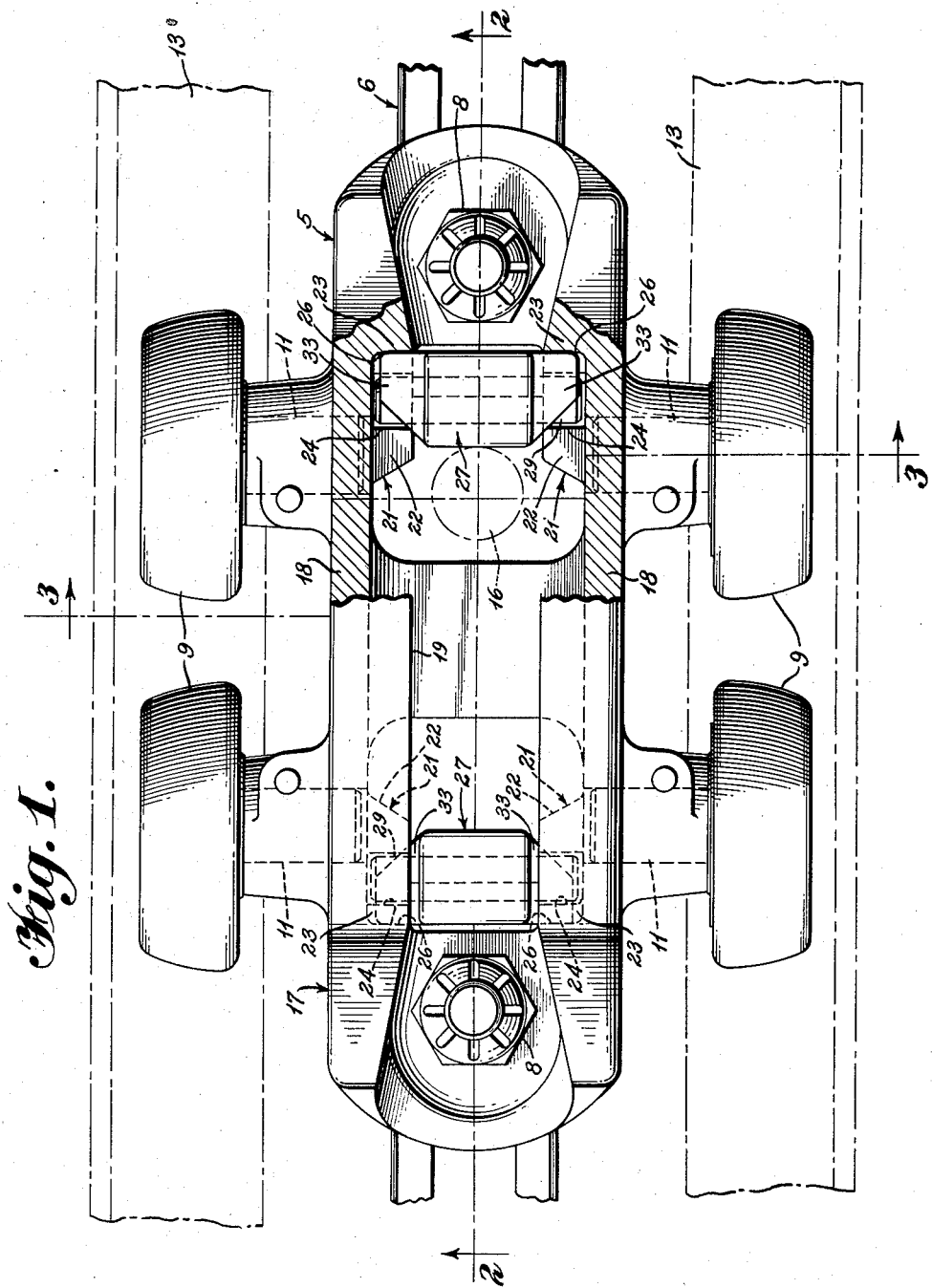
Figure 2:
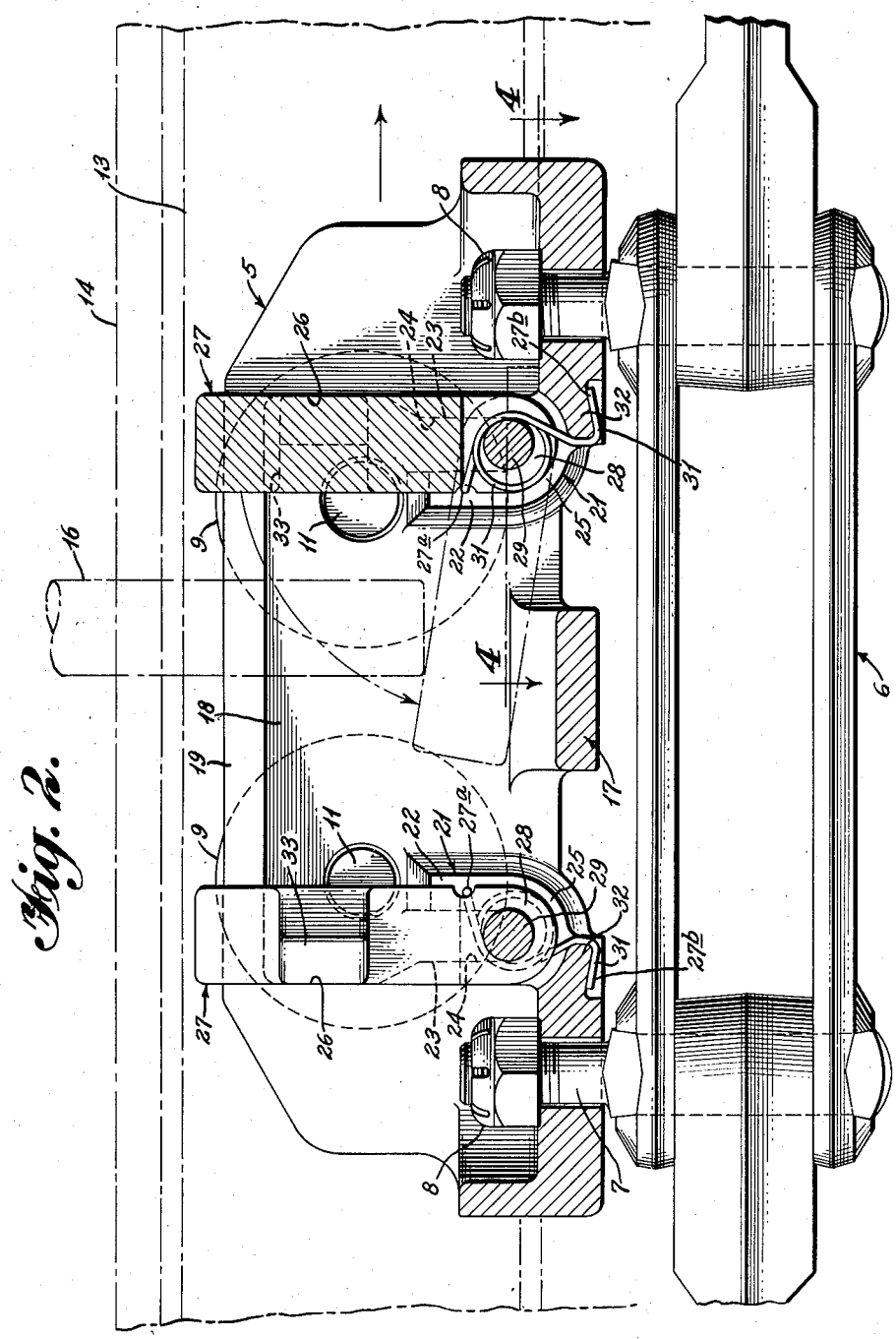
Figure 3:
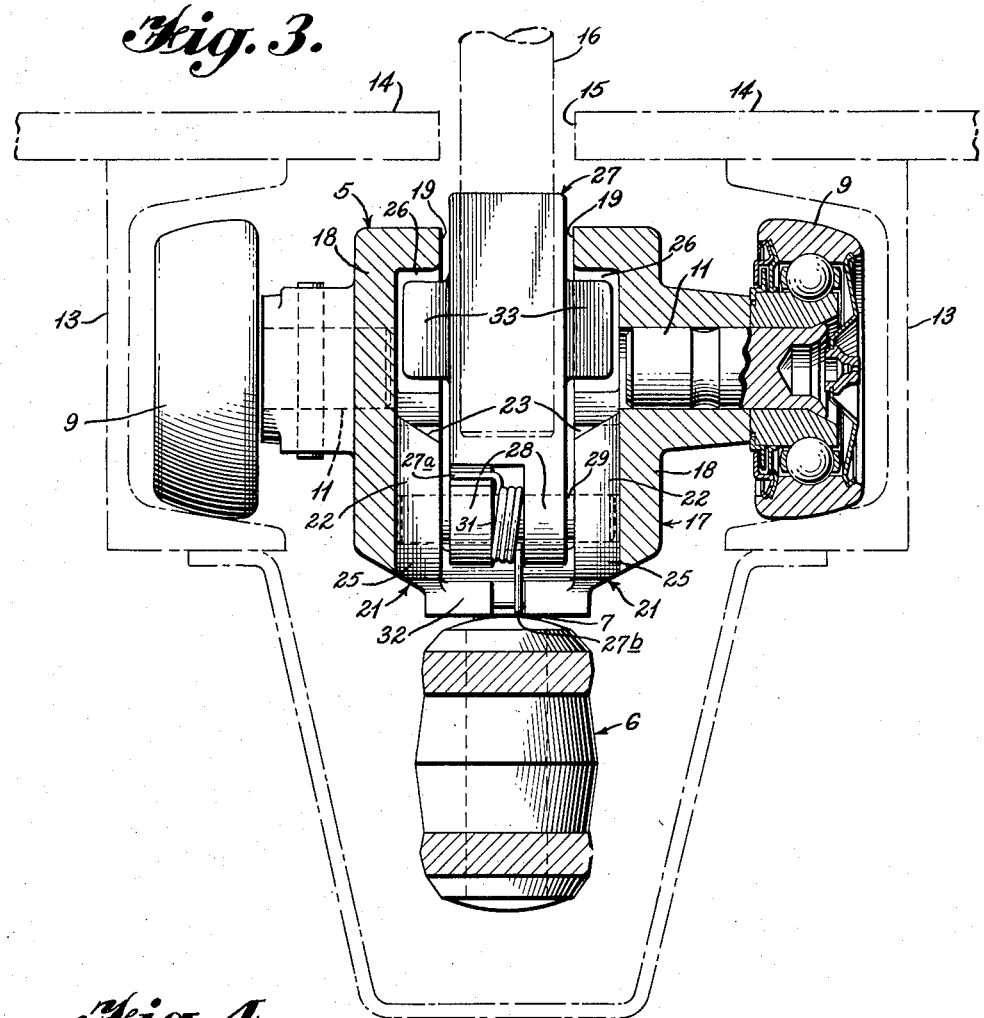
Figure 4:
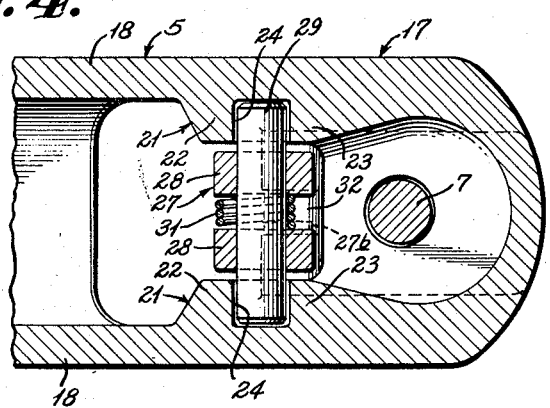
Figure 5:
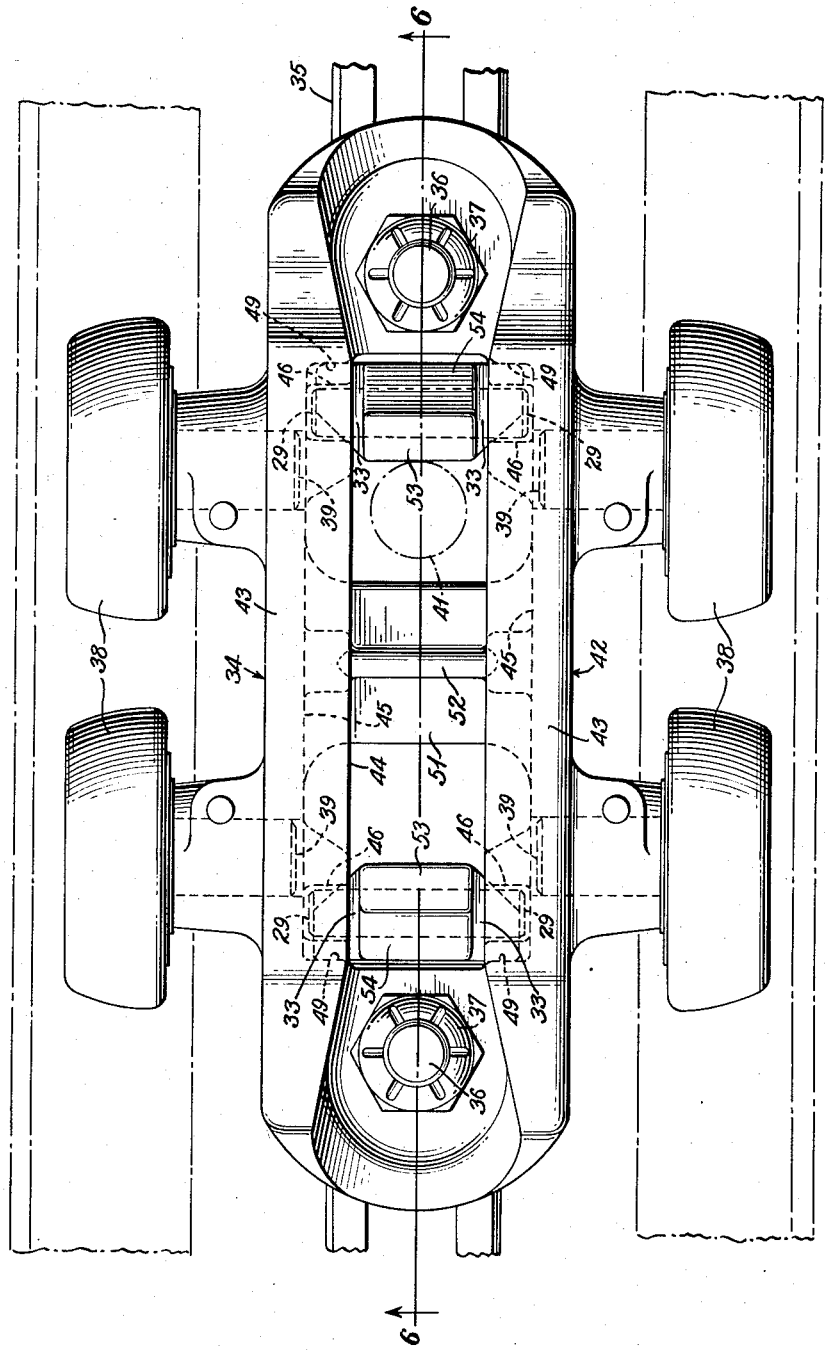

In the accompanying drawings forming a part of this specification and in which like reference characters are employed to designate like parts throughout the same, Figure 1 is a top plan view, partly broken away, of a pusher assembly embodying the invention, Figure 2 is a vertical sectional view taken on line 2—2 of Fig. 1, Figure 3 is a vertical sectional view taken on line 3—3 of Fig. 1, Figure 4 is a horizontal sectional view taken on line 4—4 of Fig. 2, Figure 5 is a top plan view of a pusher assembly embodying a modified form of the invention, Figure 6 is a vertical sectional view taken on line 6—6 of Fig. 5, and Figure 7 is a fragmentary sectional view taken on line 7—7 of Fig. 6.

In the drawings, wherein for the purpose of illustration are shown the preferred embodiments of this invention, and first particularly referring to Figs. 1 to 4, inclusive, reference character 5 designates a pusher assembly that is connected to a drive line conveyor chain 6 by the extended chain pins 7 and lock nuts 8. The pusher assembly 5 is supported and in turn supports the drive chain 6 by means of longitudinally spaced pairs of rolls 9 which are mounted on stub axles 11 projecting from the sides of the pusher assembly.

The rolls 9 facilitate movement of the pusher assembly along the trackway formed by the channel members 13. The channel members 13 may be associated with cover plates 14 which are spaced to provide a slot 15 through which a drive pin 16 may be inserted into the path of movement of the pusher assembly 5. The drive pin 16 may be connected to a floor truck, or any other similar type of load supporting device, not shown, in such a manner that the pin is movable into and out of the slot 15.

The pusher assembly 5 is formed with a body member 17 having laterally spaced side walls 18, the upper edge portions of which are inwardly flanged to provide a guideway 19 for the drive pin 16. At the opposite ends of the body member 17, the flanged upper edges of the side walls 18 are tapered laterally outwardly to facilitate movement of the drive pin 16 into the guideway 19.

Formed in longitudinally spaced relationship on the inner faces of the side walls 18 are two laterally opposed pairs of U-shaped bosses 21 which project inwardly from the walls for a distance substantially equal to that of the flanged upper edges of the walls. The longitudinal inner wall 22 and the outer wall 23 of each boss 21 provide therebetween a mounting slot 24 while the rounded bottom portion 25 provides a bearing support. It will be noted that the tops of the inner walls 22 of the bosses 21 terminate short of the flanged upper edges of the walls 18 to provide open ends for the mounting slots 24, for a purpose that will be later described, and that the bearing supports 25 provided by the bosses 21 are arranged in laterally opposed pairs on the opposite walls 18. It will also be noted that the upper portions of the outer walls 23 of the bosses 21 are laterally offset to provide stops or abutments 26, the purpose of which will be later described.

Dogs 27, having laterally spaced mounting arms 28 at their lower end portions, are mounted in the body member 17 by means of pins or shafts 29 which extend through aligned holes formed in the arms 28 and project from the opposite sides of the dogs. The laterally extending portions of each pin 29 are inserted into the mounting slots 24 through their open upper ends and are moved downwardly through the slots until they rest upon the bearing supports 25 of laterally opposed bosses 21.

Coiled around each pin 29 between the spaced mounting arms 28 of its associated dog 27 is a spring 31 having one end portion 27a bent laterally for engagement with the inner side of its associated dog 27 and the other end portion 27b hooked longitudinally under the lip 32 at the bottom of the body portion 17. The hooked end portion 27b of each spring 31 will be deflected to clear the lip 32 as the extended portions of its pin 29 are moved downwardly through their associated mounting slots 24 and the subsequent release of such hooked end will permit it to snap into its position underlying the lip 32. Each pin 29, therefore, is restrained from vertical movement in its associated mounting slots 24 and is held in contact with its associated bearing supports 25 by the spring 31. Further, the spring 31 will apply a force to the associated dog 27 urging the latter to move pivotally toward the outer end of the body member 17 to effect engagement between the laterally projecting lugs 33 at each side of the dogs and the abutments or stops 26 at the offset upper ends of the outer walls 23 of the bosses 21. The dogs 27, therefore, when pivotally moved away from the abutments 26, will be returned to engagement with the abutments by the springs 31.

As the pusher assembly 5 approaches a drive pin 16, the dog 27 at the lead end of the pusher will be pivoted inwardly by engagement with the pin, as illustrated by the broken lines of Fig. 2. As soon as this dog 27 has passed beneath the pin 16, the dog will be returned to its normal operating position in engagement with the abutments 26 by the spring 31. The dog 27 at the following end of the pusher assembly 5 then will drivingly engage the pin 16.

The above described mounting of the dogs 27 in the body member 17 requires no special machining operations on the body member. The body member 17 is customarily cast so that the bosses 21 and mounting grooves 24 may be formed in the casting operation and the aligned openings in the arms 28 of the dogs may be similarly formed. Further, the hooked end portions of the springs 31 may be deflected by means of a screwdriver, or the like, to permit assembly and disassembly of the dogs 27 and body member 17 quickly and easily.

Referring now to Figs 5 to 7, inclusive, for a detail description of the modification of the invention illustrated therein, there is shown a pusher assembly 34 that is connected to a drive line conveyor chain 35 by extended chain pins 36 and lock nuts 37. The pusher assembly 34 is supported, and in turn supports the drive chain 35 by means of longitudinally spaced pairs of rolls 38 which are mounted on laterally projecting stub axles 39. The rolls 38 facilitate movement of the pusher assembly along a trackway, identical to that described in connection with the pusher assembly of Figs. 1 to 4, for guiding the movement of the pusher assembly 34 and the drive pin 41 of a floor truck, or any other similar type of load supporting device, not shown, the drive pin being insertable into the path of movement of the pusher assembly.

The pusher assembly 34 is formed with a body member 42 having side walls 43 which are spaced laterally from each other to provide a guideway 44 therebetween for the drive pin 41. At the opposite ends of the body member 42, the side walls 43 are tapered laterally outwardly to facilitate movement of the drive pin 41 into the guideway 44.

Formed in each of the opposed inner faces of the side walls 43 is a recess 45 the configuration of which is such as to provide two longitudinally spaced and laterally opposed pairs of upwardly opening U-shaped slots 46 on the two inner faces of the walls. The rounded bottom portion of each slot 46 provides a bearing support 47 for a purpose that will be later described. The upper edge of each recess 45 is formed to provide two arcuate retaining surfaces 48 which curve downwardly and inwardly from positions above the two slots 46 toward the middle of the body member 42. The opposite ends of each recess 45 are vertically formed to provide stops or abutments 49. Extending between and connecting the lower marginal portions of the two side walls 42 at the middle portion of the pusher assembly 34 is a cross brace 51 the upper surface of which has formed thereon a laterally extending bead 52 the purpose of which will be later described.

Mounted in the two longitudinally spaced pairs of slots 46 of the body member 42 are the two pusher dogs 53 which are identical to the previously described dogs 27, of Figs. 1 to 4 except that the upper portions of the dogs 53 have their longitudinally outer surfaces tapered inwardly to provide camming surfaces 54. The pins and springs associated with the dogs 53 are identical to those associated with the dogs 27 and corresponding reference characters have been applied to the corresponding parts thereof.

The mounting of the dogs 53 in the slots 46 of the body member 42 is the same as that described in connection with the dogs 27. It will be noted, however, that the dogs 53 are inserted into the space between the two side walls 43 in a roughly horizontal position from which the extended portions of the pins 29 may be lowered into the open upper ends of the slots 46 with the hooked end portion 27b of the associated spring 31 deflected to clear the lips 55 at the bottom of the body member 42. The subsequent release of the hooked end portion 27b of each spring will permit said end portion to snap into its position underlying the associated lip 55 to retain the pin in seated relationship with the bearing supports 47. Further, the spring 31 will apply a force to the associated dog 53 to move the latter pivotally to a position at which the laterally projecting lugs 33 will engage the stops 49.

It will be readily apparent that the arcuately formed retaining surfaces 48 lie radially outwardly of the lugs 33 at opposite sides of the dogs 53 throughout a substantial portion of the pivotal movement of the dogs between their positions at which the lugs engage the abutments or stops 49 and substantially horizontal positions. The surfaces 48, therefore, positively prevent vertical displacement of the pins 29 in their associated slots 46 to such an extent as could cause damage to the springs 31.

As the pusher assembly 34 approaches a drive pin 41, the dog 53 at the lead end of the pusher will be pivoted inwardly by engagement with the pin, as illustrated by broken lines of Fig. 6. Due to slight variations in the level of the lower ends of the pins 41 engaged by the dogs 53, a dog will occasionally be moved into engagement with the bead 52 which holds the dog out of engagement with the flat upper surface of the cross brace 51. Therefore, an accumulation of grease, or other sticky foreign matter, on the top surface of the cross brace cannot cause the dog to be held against return to its normal vertical position. The camming surfaces 54 at the upper end portions of the dogs 53 also function to assist in preventing binding between the drive pin 41 and the dog which might cause the pin 29 to rise in its associated slots 46 and thereby stretch or break the spring 31. Further, the inclined camming surface of each dog 53 provides clearance for the movement of the pin 41 over the outer end portion of the dog to reduce the extent of pivotal movement of the dog by movement of the pin thereover.

As was mentioned in connection with the pusher assembly of Figs. 1 to 4, the mounting of the dogs 53 in the body member 42 requires no special machining operations on the body member which is customarily cast so that the recesses 45 are formed in the manner described above.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a pusher assembly for a drive line conveyor, a body member having laterally spaced mounting slots closed at one end to provide laterally spaced bearing supports, a dog having laterally extending shaft portions insertable into said slots in journaled relationship with said bearing supports, and a normally stressed spring carried by said dog and engaging said dog and a surface portion of said body member that is arranged at an angle with the lengths of said slots to retain said shaft portions in said journaled relationship and to bias said dog into an upstanding position with respect to said body member.

2. In a pusher assembly for a drive line conveyor, a body member having laterally spaced wall portions each of which has a mounting slot formed therein that is closed at one end, the closed ends of the slots providing laterally spaced bearing supports, a dog, a shaft projecting lateraly from opposite sides of the dog, the projecting portions of said shaft being insertable into said slots in journaled relationship with said bearing supports, and a normally stressed spring carried by said shaft and having spaced portions extending therefrom for engaging said dog and a surface portion of said body member that is arranged at an angle with the lengths of said slots to cause said spring to retain said shaft portions in said journaled relationship and to bias the dog into an upstanding position with respect to said body member.

3. In a pusher assembly for a drive line conveyor, a body member having laterally spaced wall portions each of which has a mounting slot formed therein that is closed at one end, the closed ends of said slots providing laterally spaced bearing supports, a dog having laterally spaced mounting arms, a shaft extending through said arms and projecting laterally from opposite sides of said dog, the projecting portions of said shaft being insertable into said slots in journaled relationship with said bearing supports, and a spring coiled around the shaft between said arms and having its opposite end portions engaging said dog and said body member to bias the dog into an upstanding position with respect to said body member, the end portion of said spring engaging said body member being hooked around a portion of the latter to retain said shaft portions in said journaled relationship.

4. In a pusher assembly for a drive line conveyor, a body member having laterally spaced wall portions each of which has a laterally inwardly extending U-shaped projection, the parallel walls of each U-shaped projection forming a mounting slot therebetween and the rounded end portion providing a bearing support, a dog having laterally projecting shaft portions insertable into said slots in journaled relationship with said bearing supports, and a normally stressed spring carried by said dog and having spaced portion engaging said dog and said body member to bias said dog into an upstanding position with respect to said body member, the portion of said spring engaging said body member bearing against a surface portion of the latter which is arranged at an angle with the lengths of said slots to retain said shaft portions in said journaled relationship.

5. In a pusher assembly for a drive line conveyor, a body member having laterally spaced wall portions each of which has a laterally inwardly extending U-shaped projection, the parallel walls of each U-shaped projection forming a mounting slot therebetween and the rounded end portion providing a bearing support, a dog having laterally spaced mounting arms, a shaft extending through said arms and projecting laterally from opposite sides of said dog for insertion into said slots in journaled relationship with said bearing supports, and a spring coiled around said shaft between said arms and having its opposite end portions engaging said dog and said body member to bias the dog into an upstanding position with respect to said body member, the end portion of said spring engaging said body member being hooked around a portion of the latter to retain said shaft portions in said journaled relationship.

6. In a pusher assembly for a drive line conveyor, a body member having laterally spaced side walls, said side walls having inwardly flanged upper edge portions spaced to provide a guideway therebetween and having laterally opposed, U-shaped projections on their inner faces, the parallel walls of each U-shaped projection forming a mounting slot therebetween and the rounded end portion forming a bearing support, a dog having laterally extending shaft portion insertable into said slots in journaled relationship with said bearing supports, and a normally stressed spring carried by said dog and engaging said dog and a surface portion of said body member that is arranged at an angle with the lengths of said slots to retain said shaft portions in said journaled relationship and to bias said dog into an upstanding position with respect to said body member.

7. In a pusher assembly for a drive line conveyor, a body member having laterally spaced side walls, said side walls each having a flange extending longitudinally and inwardly of its upper edge portion, and a pair of longitudinally spaced, inwardly extending U-shaped projections on its inner face, said flanges being spaced to provide a guideway therebetween and said projections having their open end portions directed upwardly and being arranged in laterally opposed pairs, the parallel walls of each U-shaped projection forming a mounting slot therebetween and the rounded end portion forming a bearing support, a pair of dogs each having laterally extending shaft portions insertable into one of said pairs of slots in journaled relationship with the bearing supports thereof, and a normally stressed spring carried by each dog and engaging said dog and a surface portion of said body member that is arranged at an angle with the lengths of said slots associated with the dog to retain said shaft portions in said journaled relationship and to bias the dog into an upstanding position with respect to said body member.

8. In a pusher assembly for a drive line conveyor, a body member having laterally spaced side walls to provide a guideway therebetween, said side walls having their opposed inner surfaces recessed to form a laterally opposed pair of vertically arranged slots each having an open upper end and a closed lower end to form a bearing support, the recess in each side wall having its upper edge curved downwardly and inwardly from a position above the open upper end of the slot formed by the recess to provide a retaining surface at a substantially uniform radius from the bearing support, a dog having laterally extending shaft portions insertable into said slots in journaled relationship with said bearing supports and having laterally extending retaining lugs underlying said retaining surfaces to positively limit movement of said shaft portions away from their bearing supports, and a normally stressed spring carried by said dog and engaging said dog and a surface portion of said body member that is arranged at an angle with the lengths of said slots to normally retain said shaft portions in said journaled relationship and to bias said dog into an upstanding position with respect to said body member.

9. A pusher assembly as defined in claim 8 further characterized by the recess in each side wall having a vertically arranged end portion above and at one side of the slot formed by the recess for engaging the retaining lug on the adjacent side of said dog to limit movement of the latter by said spring to the normal upstanding operating position of the dog, and a cross member extending between the lower marginal portions of said side walls at the center portion of said body member and having an irregularly formed top surface for restricted engagement with said dog to limit movement of the latter away from its normal upstanding operating position and to prevent adhesion between said dog and cross member due to the accumulation of sticky foreign matter on the latter.

10. A pusher assembly as defined in claim 8 further characterized by said dog having a vertically tapered upper end portion to provide an inclined camming surface on the longitudinal outer side of the dog for engagement to effect pivotal movement of the dog out of its normal upstanding position.

References Cited in the file of this patent

UNITED STATES PATENTS

| | | |
|---|---|---|
| 300,087 | Kettering | June 10, 1884 |
| 304,380 | Warner | Sept. 2, 1884 |
| 396,031 | Devore et al. | Jan. 8, 1889 |
| 399,964 | Benet | Mar. 19, 1889 |
| 416,460 | Hoefer | Dec. 3, 1889 |
| 1,740,014 | Hawkins | Dec. 17, 1929 |
| 1,768,486 | Ogden | June 24, 1930 |
| 1,857,894 | Uline | May 10, 1932 |
| 1,859,486 | Aimes | May 24, 1932 |
| 2,101,353 | Walkes | Dec. 7, 1937 |
| 2,132,455 | Bishop | Oct. 11, 1938 |
| 2,619,370 | Leger | Nov. 25, 1952 |
| 2,621,610 | Boyko et al. | Dec. 16, 1952 |

FOREIGN PATENTS

| | | |
|---|---|---|
| 86,121 | Germany | July 9, 1895 |
| 86,122 | Germany | July 9, 1895 |